Aug. 22, 1961  S. M. MacNEILLE  2,997,594
TARGET-SEEKING HEAD FOR GUIDED MISSILE
Filed March 19, 1958
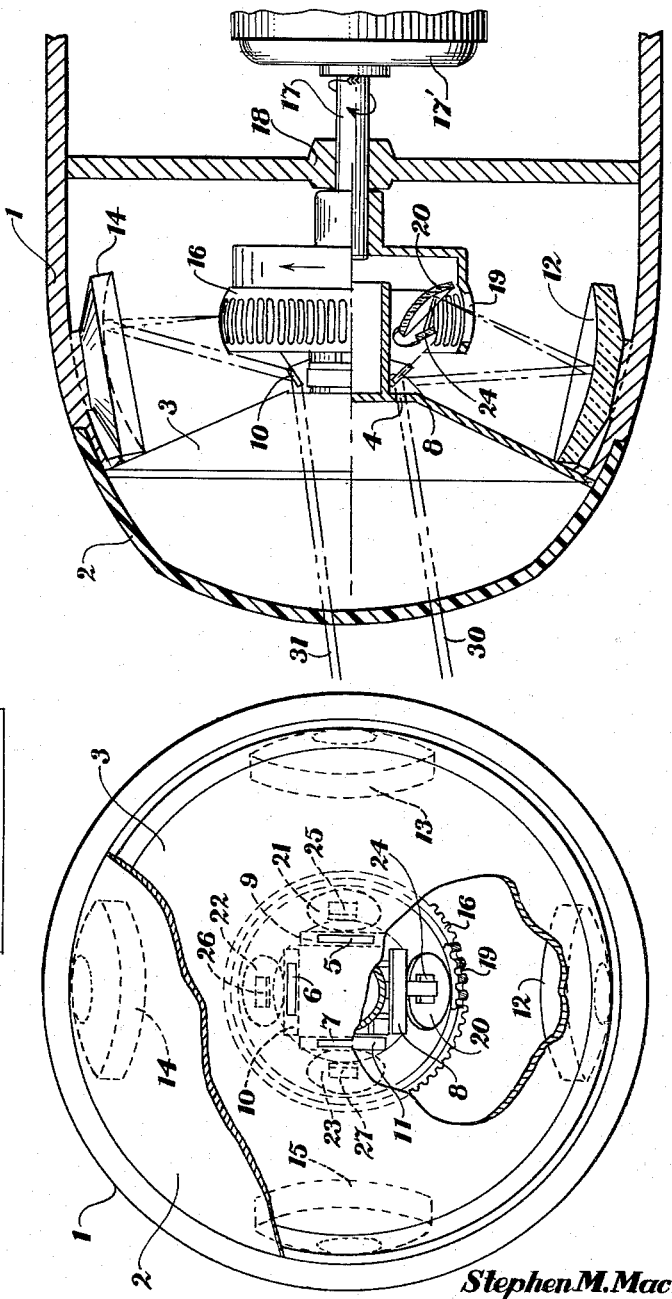
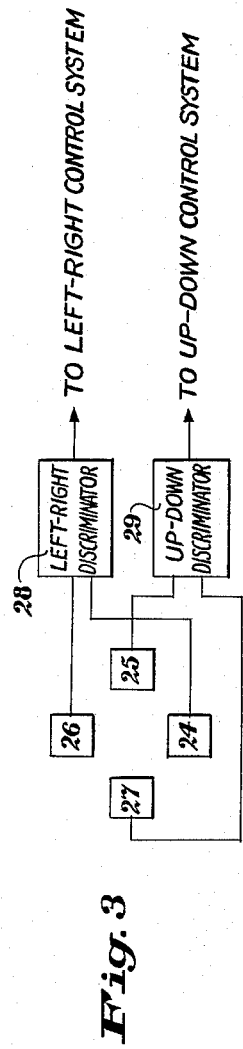
Stephen M. MacNeille
INVENTOR.

United States Patent Office 2,997,594
Patented Aug. 22, 1961

2,997,594
TARGET-SEEKING HEAD FOR GUIDED MISSILE
Stephen M. MacNeille, Thompson, Conn., assignor, by mesne assignments, to the United States of America as represented by the Secretary of the Navy
Filed Mar. 19, 1958, Ser. No. 722,619
2 Claims. (Cl. 250—203)

This invention relates to a target-seeking head for guided missiles which is particularly well adapted for generating guidance signals derived from infrared or other radiant energy emanating from a target whereby to direct the missile into a collision course with the target. Like many guidance systems for this same general purpose, it is a two coordinate system utilizing a separate set of target-sensing elements for each of two rectangularly related coordinate planes which, for ease of description will be termed the left-right and up-down planes.

It is well known in the art that so long as the line of sight from a missile to a given target remains at a constant angle with the axis of motion of the missile, the latter will be on a true collision course with the target. On the other hand any shift in the angle of the line of sight indicates that the missile is off course in one direction or another, the direction and rate of shift of the sighting angle being indicative of the corrective control action necessary to bring the missile back into its desired collision course.

It is therefore an object of this invention to provide a target-seeking head for sensing the direction and extent of shift in the line of sight from a missile to a target and which is capable of producing output signals, useable for control purposes, indicative of this shift.

It is a further object of this invention to provide such a target-seeking head wherein a scanning element is caused to sweep at a constant linear rate across an image of the target field, the scanning element being arranged to alternately interrupt and then pass radiant energy emanating from the target to a suitable detector which will convert this energy into useable electrical energy. With such an arrangement, when the missile is on course, the image of its target will be fixed in position at the scanning plane and the resulting output from the detector will be a series of pulses occurring at a predetermined frequency, which will be hereinafter termed the normal scanning frequency. If the missile is off course, the target image will have a component of movement either in the same direction as the movement of the scanning element, or in the opposite direction. In the first instance the output pulses from the detector will occur at a frequency which will be lower than the normal scanning frequency; in the second instance the output frequency will be somewhat higher than the normal scanning frequency. The greater the rate of change in the angle of the line of sight relative to the axis of the missile, the greater will be the relative rate of motion of the target image at the scanning plane and the greater will be the change in frequency from the normal scanning frequency.

It is a further object of this invention to provide such a target-seeking system wherein the scanning means constitutes a drum having a series of scanning slots therein and wherein a system of plane and spherical mirrors is so related to the drum that this single drum is utilized for scanning in each of two coordinate planes.

Further objects of the invention will become apparent from the following detailed description and claims especially when considered in the light of the accompanying drawing wherein:

FIG. 1 is a front view of a missile incorporating my invention, with parts broken away to show the internal construction;

FIG. 2 is a fragmentary longitudinal sectional view of the invention; and

FIG. 3 is a block diagram illustrating a system for utilizing the information obtained by the seeker head of my invention.

My invention is illustrated as applied to a missile 1 having a nose 2 which is transparent to the particular type of radiant energy which is to be detected. Rearwardly of the nose 2 is a main bulkhead or supporting member 3 provided with four rectangularly related apertures 4, 5, 6 and 7 symmetrically located about the axis of the missile. Directly behind each of these slots is a plane mirror, these mirrors being designated 8, 9, 10 and 11, respectively, mounted at an angle relative to the axis of the missile so as to reflect rays of radiant energy passing through the associated aperture onto the spherical mirrors 12, 13, 14 and 15 mounted adjacent the outer wall of the missile. These mirrors, in turn, serve to focus the energy onto the periphery of a scanning drum 16, mounted on a rotary drive shaft 17 carried by suitable bearings such as 18. Shaft 17 is adapted to be driven at a constant speed, as by a suitable motor 17′, which, with the shaft, constitutes means for rotating the scanning drum 16 at a constant angular velocity.

The peripheral wall of drum 16 is provided with a plurality of elongated slots 19, the spacing between successive slots being substantially equal to the width of the slots. Thus, as this drum is rotated rays striking any portion of its periphery will be alternately blocked or allowed to pass through to the inside of the drum at a frequency dependent upon the relative speed of rotation of the drum. Rays passing through the drum slots 19 impinge upon one of four spherical collecting mirrors 20–23 fixedly supported from the main supporting member 3, and are redirected thereby to the corresponding detectors 24, 25, 26 and 27, likewise fixedly carried by the supporting member 3.

The apertures 4 and 6, mirrors 8, 10, 12, 14, 20 and 22 and detectors 24 and 26 serve, in conjunction with the drum 16 to sense the target position relative to the missile in the left-right coordinate plane, while the apertures 5 and 7 and their associated mirrors and the detectors 25 and 27 serve to sense the relative target position in the up-down coordinate plane. As indicated in FIG. 3 detectors 24 and 26 are adapted to apply their output signals to a left-right discriminator 28 the output of which may be utilized to control the direction of the missile in that particular plane. Similarly detectors 25 and 27 are connected to an up-down discriminator 29, the output of which serves to control the up-and-down movement of the missile.

Except for the fact that the left-right and up-and-down channels utilize the same scanning drum 16, their action is entirely independent of one another and a description of one channel will therefore suffice for both. Considering then the action of the left-right scanning system, FIG. 2 shows bundles of rays of energy 30 and 31 emanating from a target (not shown) but which is located somewhat below the longitudinal axis of the missile. If the missile is on course in the left-right plane, the bundle of rays 30 and 31 will be deflected by mirrors 8 and 10 and focused by mirrors 12 and 14 onto the periphery of the drum 16 at diametrically opposite points. These images will remain stationary relative to the missile as a whole and, as the drum 16 rotates the slots 19 thereof will sweep past these images to cyclically pass energy to the associated detectors 24 and 26 at a normal rate which will be termed the normal scanning frequency. This frequency is, of course, determined by the rate of rotation of drum 16 and the number of slots provided in the periphery thereof. So long as the missile remains on course in this left-right plane the frequency of the signals produced by detectors 24 and 26 will be the same and will equal the normal scanning frequency. However, if the line of sight to the target relative to the missile axis is shifting, for example, to the left (out of the plane of the paper in FIG. 2), the images formed by rays 30 and 31 will have a corresponding movement into the plane of the paper. It can readily be seen that, since this movement of the image formed by rays 31 is in the same direction as the movement of the scanning drum at this point, the pulses from detector 26 will occur at a correspondingly slower frequency. At the same time the movement of the image formed by rays 30 will be in a direction opposite to the movement of the scanner drum at that point and, as a result, the output pulses from detector 24 will occur at a frequency somewhat higher than the normal scanning frequency. The faster the rate at which the line of sight shifts relative to the missile axis, the greater the shift in frequency of the outputs of detectors 24 and 26. Since any change of direction of the line of sight produces shifts in opposite directions of the output frequencies from the detectors 24 and 26, a comparison of these two frequencies will enable a ready determination of any such shift. Moreover, the magnitude of the frequency difference between the two outputs of detectors 24 and 26 will be a measure of the rate at which this angle is shifting and therefore will be indicative of the degree of control correction required. Thus, if the frequency of output signal from detector 26 is decreasing relative to that from detector 24 it is indicative of a shifting of the line of sight to the target to the left, while the magnitude of the difference between these frequencies is indicative of the amount of left correction required to redirect the missile. Conversely, if the output from detector 26 is at a higher frequency than that from detector 24, it is indicative of the fact that the line of sight is shifting to the right and that appropriate correction to the right should be made in the direction of movement of the missile, in an amount dependent upon the difference in frequency.

As previously mentioned the operation of the up-down channel and associated components will in all respects be similar to that described in detail in relation to the left-right channel. Thus, if the output from detector 27 is at a higher frequency than that from detector 25 it will indicate that the missile should be directed somewhat downwardly whereas if the output from detector 27 is at a lower frequency than that from detector 25 it will indicate that up-correction is required. In either case the amount of correction required will be proportional to the difference in frequency between the two detector outputs.

In order to obtain useable control signals, it is therefore merely necessary to apply the outputs of detectors 24 and 26 and of detectors 25 and 27 to suitable discriminators 28 and 29 respectively capable of measuring the difference in frequency of the two inputs and of sensing the relative direction of the frequency change of one detector output relative to the other. Discriminators capable of producing an output signal indicative of both the magnitude and sense of any frequency difference between two input signals are well known in the art and no further description of such a discriminator is therefore believed necessary to an understanding of the instant invention by those skilled in the art.

From the above it is believed apparent that the objects of this invention have been attained in that a target-seeking head has been disclosed which is of relatively simple construction and which is capable of producing signals indicative of both the degree and direction of control actuation necessary to guide a missile on a desired collision course to a target.

In the specific embodiment disclosed, to avoid unnecessary confusion, the line of flight of the missile has been assumed to be coincident with the longitudinal axis of the missile and the seeker head has therefore been shown as rigidly mounted on the missile. As is well known in the art, in an actual missile the seeker head would normally be carried on a gyro stabilized assembly within the missile so that pitch or yaw motions of the missile would not produce false guidance information. The principles of the invention are obviously equally applicable to such an arrangement and the term missile axis as used herein is intended to mean the actual line of flight of the missile whether it be coincident with the longitudinal axis of the missile itself or to a gyro-stabilized reference axis within the missile.

Obviously many variations in the specific arrangement of the parts may be made without departing from the spirit and scope of the invention as defined by the appended claims.

I claim:

1. A target seeking head for generating signals indicative of the dynamic relationship, in each of two rectangularly related coordinate planes, of the line of sight between said head and a target to a predetermined reference axis through said head, comprising a scanning drum mounted for rotation about said axis, radiant energy directing means including at least a pair of spherical mirrors arranged to direct radiant energy emanating from said target along two separate paths and into substantial focus at peripherally spaced locations on the periphery of said drum to produce a pair of images of said target at said locations, said energy directing means being so arranged that shifting of said line of sight relative to said axis in one of said coordinate planes will produce a corresponding shifting of one of said images peripherally of said drum and shifting of the line of sight in the other coordinate plane will produce a corresponding shifting of the other of said images about the periphery of said drum, means for rotating said drum at a constant angular velocity, said drum being provided with a plurality of scanning slots equally spaced about the periphery thereof and arranged to sweep past said images upon rotation of said drum, a pair of energy responsive detectors, one associated with each of said coordinate planes, and a corresponding pair of energy collecting and reflecting surfaces respectively positioned to receive energy passing through said slots as they sweep past said images and to direct it onto the associated detectors whereby energy reaching either of said detectors will be modulated at a frequency which will vary in accordance with any shifting of said line of sight relative to said axis in the corresponding coordinate plane.

2. A target seeking head as defined by claim 1 wherein there is a second set of energy directing means, energy collecting and reflecting surfaces and energy detectors associated with each of said coordinate planes, the energy directing means of said second sets being arranged to produce, at separate locations on the periphery of said drum, a second pair of target images which, for a given shift in the line of sight to the target relative to said axis, will shift in the opposite directions relative to the direction of rotation of said drum from the corresponding images produced by said first-mentioned energy directing means, whereby the frequency of modulation of the energy reaching the two detectors associated with either coordinate plane will vary in opposite directions for a given shifting of said line of sight in the associated coordinate plane.

No references cited.